Dec. 4, 1951
T. A. ABBOTT ET AL
2,577,696
ELECTRIC POSITIONING-PROPORTIONAL FLOATING CONTROL
Filed March 22, 1946
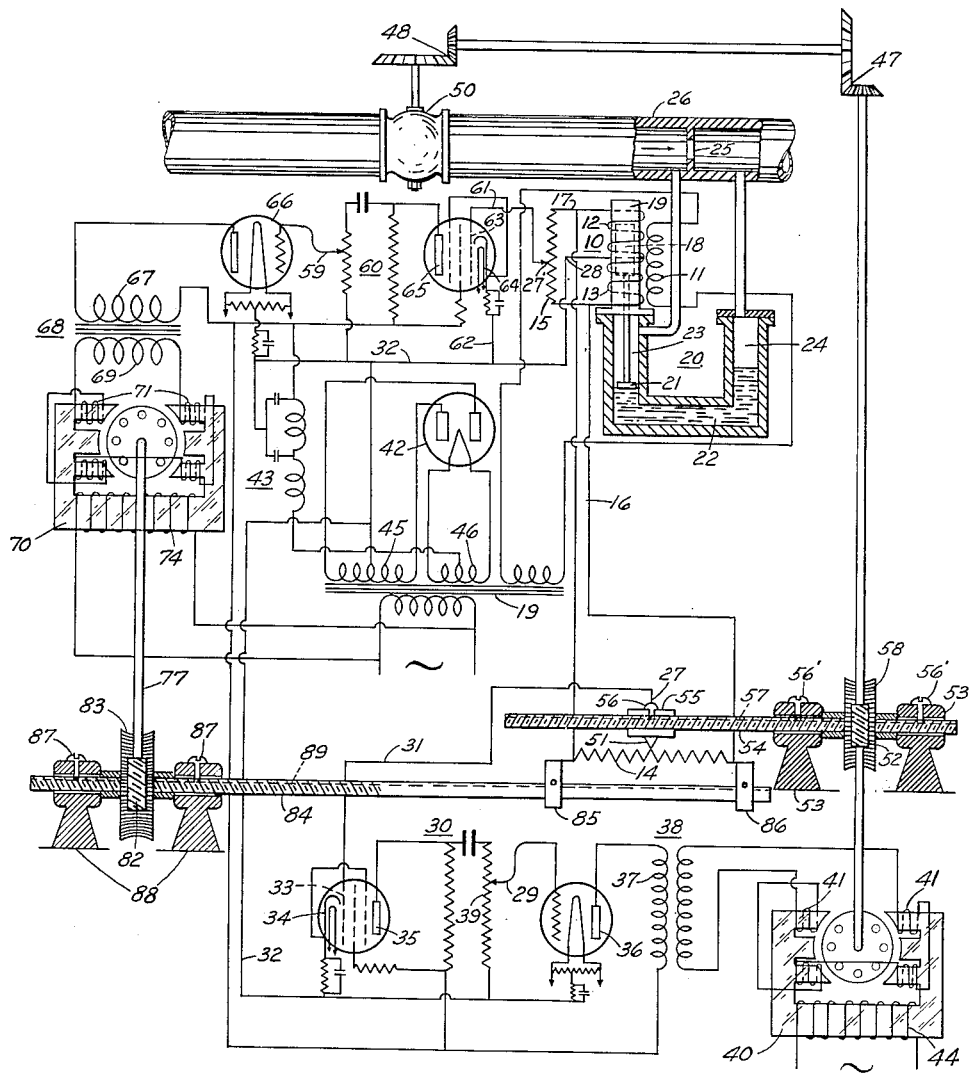
INVENTORS
Thomas A. Abbott &
Jerome B. McMahon
BY
Robert A. Lavender Patented Dec. 4, 1951

2,577,696

UNITED STATES PATENT OFFICE 2,577,696

ELECTRIC POSITIONING-PROPORTIONAL FLOATING CONTROL

Thomas A. Abbott, La Grange, and Jerome B. McMahon, Wilmette, Ill., assignors, by mesne assignments, to the United States of America as represented by the United States Atomic Energy Commission Application March 22, 1946, Serial No. 656,463

2 Claims. (Cl. 318—28)

This invention relates to the art of regulating or controlling a variable quality, quantity or condition and more particularly to an improved method and apparatus for effecting the control automatically in accordance with changes of said quality, or condition, which may, for example, include changes in temperature, rate of flow or pressure.

Automatic control devices of the general type to which this invention relates are well known to the art and employ many different controller actions, typical types of which include floating controller action which may be either single or multi-speed; and proportional position controller action. In the floating controller action there is a predetermined relation between the values of the control variable, and the rate of motion of a final controlled element, the action may be single speed in which event there is but a single rate of motion of the final controlled element; or multi-speed controller action may be provided in which event there are two or more speeds of the final control elements, each corresponding to the definite range of values of the controlled variable.

In the proportional position controller action there is a continuous linear relation between the position of a final control element and the value of the controlled variable.

It is a primary object of this invention to provide a controller action in which proportional position and floating actions are combined.

It is a further object of this invention to provide an electrical control system that will overcome the droop of the proportional positioning controller action by the addition of a floating feature.

Another and more specific object of this invention is to provide an electrical system for controlling automatically a condition, quantity or quality employing essentially two Wheatstone bridge networks having a common impedance branch opposite arms of which are variable differentially in accordance with the changes in the controlled variable and to energize a reversible electrical motor from the output derived from the unbalance in a first one of said bridge circuits to driving a final control element in a direction effecting a corrective adjustment of said controlled variable and for producing a rebalancing adjustment in said first bridge network. The electric output derived from a second one of said bridge circuits is utilized to energize a second reversible motor for modifying the rebalancing adjustment of said first bridge by said first motor to maintain the unbalance of said first bridge until said second bridge is returned to balance by the response of said controlled variable to the corrective adjustment produced by the final control element driven by said first motor.

It is still another object of this invention to provide a regulating system with a control circuit for an electric motor of a type which is adapted to be operated at variable speeds in one direction or in an opposite direction, or to stall, accordingly as an energizing action impressed upon the motor varies in magnitude and phase whereby the motor will operate at a speed and in a direction to drive means capable of effecting a corrective adjustment of a controlled variable; the said control circuit including a first impedance element variable in accordance with changes in the said controlled variable so that an electric quantity may be derived from the circuit having a magnitude and phase variable accordingly with the changes in magnitude and directions in said controlled variable for producing the energizing action for said motor. This control circuit is also provided with another impedance having two movable elements; the first one of said elements being movable relative to the other of said elements by the motor effecting corrective adjustment in said controlled variable to reduce the electric quantity derived from said circuit so that said first element will have a definite position corresponding to zero electrical output of said circuit for each impedance value of said first impedance element corresponding to the controlled variable. A second reversible motor is provided also, and is operable in a direction and at a speed variable in accordance with the magnitude and phase of an applied energizing action. This second motor is utilized to position the remaining one of said movable elements of said variable impedance, and receives its energizing action from a circuit that includes the first variable impedance element but excludes said second variable impedance element so that the motor will operate in the direction moving the second element to reduce the relative displacement between said elements and to prevent the electric quantity derived from said circuit including said first impedance from being reduced to its zero value until the said first variable impedance element has been adjusted to correspond to the desired value of the controlled variable.

Further objects and advantages of this invention will become more apparent from the following detailed description when taken in connection with the accompanying drawing illustrating diagrammatically a preferred embodiment of the invention wherein: The single figure illustrates, somewhat diagrammatically the presently preferred embodiment of the invention.

It will be noted from the drawing that the control system of this invention is shown as being utilized to regulate the flow of fluid in a conduit, nevertheless it will be readily appreciated by those skilled in the art that the control apparatus therein illustrated may be used advantageously in a wide variety of purposes. Likewise, while the drawing illustrates specific apparatus and instrumentalities for effecting the control in accordance with this invention the broader aspects of this invention may be more clearly understood by considering the particular form of the invention illustrated as comprising essentially the following basic instrumentalities, broadly known to the art but specifically illustrated.

The first basic instrumentality essential in the invention comprises suitable circuit networks for producing output voltages variable in magnitude and in polarity (or phase) in accordance with variations in the condition or quantity to be regulated. Any number of such circuit networks are known to the art and it has been preferred in the subject invention to utilize the output voltage derived from a reactive impedance bridge network consisting essentially of two serially connected secondary coils and a pair of shunting resistances. This output voltage derived from each bridge network is made to vary in magnitude and in phase in accordance with changes in the rate of fluid flow in the conduit by mechanically connecting a movable magnetic core associated with said secondary coils to the float of a conventional flow meter that is connected into said conduit so that the mutual reactive impedance between the primary coil and the two serially connected secondary coils may be varied differentially to induce unequal voltages within these secondary coils when a firm alternating current voltage is applied to the primary coil.

The second basic instrumentality constituting an essential feature of this invention includes two electric translating devices which are under the control of the voltage output derived from the Wheatstone bridges constituting the circuit network. Specifically a pair of shaded pole motors are illustrated. The output voltage appearing between terminals leading to the mid-connection of the serially connected coils and slidable contact on the first parallel or shunting resistance is amplified and fed to the shading windings of a first one of said shaded pole motors. The drive of this motor is connected mechanically to a valve in the conduit for controlling the rate of flow of fluid therein.

The third basic instrumentality constituting an essential part of the illustrated invention consists of a means for producing variations in output voltage that is amplified and fed to the first motor. Specifically the embodiment of the invention illustrated employs the first of the shunting resistors, i. e., the drive from the first motor is connected mechanically to the sliding contact on the first shunting resistor the position of which governs the balance or degree of unbalance in said bridge network. Thus, any change in the condition of flow of the fluid in the conduit will cause an unbalance in the bridge network energizing the first motor to move the valve to produce a change in the flow conditions and to move also the sliding contact of the first shunting resistance to a position re-balancing the bridge for the changed fluid flow conditions; in other words, these instrumentalities operate to effect a characteristic "positioning" control.

In order to counteract the delays that are associated with a regulating action described above it occurred to us that by providing a drive from a second motor energized by the unbalance produced by the change in flow conditions, to the first shunting resistor the rebalancing action could be made to depend upon two conditions, or more precisely, the relative displacement of the first shunting "slidewire" resistance and its sliding contact would be dependent upon two conditions. Accordingly a second motor is provided which receives its energizing action from the amplified output voltage taken between the mid-connection of the serially connected secondary coils and a sliding or adjustable contact on the second parallel or shunting resistor. This second motor drives the first parallel resistance in a direction so as to prevent the bridge from which the first motor is energized from attaining, immediately, a balanced condition for each and every change in condition of flow which would result if the "positioning" system of control were used, which type of control would result if the sliding contact on the first resistance alone were moved by the first motor to re-establish balance in the bridge immediately.

It should be noted before proceeding with description of the drawings illustrating the preferred embodiment of this invention that by adjusting the gain in amplification of each circuit it is possible to independently control the motor speeds and thus change the lag in control in accordance with the lag in response. Clearly, if both motors were to drive the first shunting resistance and its sliding contact at the same speeds and in the same direction a "floating" control procedure would result.

The underlying feature of this invention resides therefore in the idea of providing a second translating device which during regulation operation adjusts the position of one element of the differential potentiometer connected in the bridge circuit the output voltage of which is fed into the valve controlling motor so that the other movable element of the differential potentiometer driven by the valve control motor is (during adjustment and until ultimate rebalance) at a position between: (1) a position of rebalance with a temporary change in the relative mutual inductance of the secondary coils with a primary coil and (2) the original position to which it must and does eventually return.

Referring to the drawing, the circuit network indicated generally at 10 comprises two serially connected secondary coils 12 and 13 and two shunting and paralleling resistances 14 and 15. Each of the two paralleling resistances 14 and 15 may be regarded as forming a separate Wheatstone bridge circuit with the two serially connected coils that form the common impedance branch of each bridge circuit 16 and 17. A core 18, of magnetizing material, is shown connected mechanically to a movable float 21 of a flow meter 20 for movement vertically in a guide-way 19 for differentially varying the mutual inductance or the mutual reactive impedance between a primary coil 11 and the series connected secondary coils 12 and 13. The flow meter as illustrated is of the manometer type having the opposite legs 23 and 24 of the manometer tube 22 partially filled with a liquid, such as mercury, upon the surface of which is impressed a pressure differential correspondingly varying with changes in the rate of flow of fluid through the venturi or constriction 25 of the conduit 26. Accordingly, an A. C. voltage of varying magnitude and phase will be made to appear across the output terminals 27—28 and 27'—28 of each of the bridge circuits when the rate of flow of the fluid in the conduit 26 is increased or decreased provided suitable firm A. C. voltage is applied to the primary coil 11, for example in a manner similar to that illustrated in the drawing.

The conductors 31 and 32 leading from the terminals 27 and 28 respectively of the first bridge network are shown connected to the input of the first stage of the amplifier 30 by being connected respectively to the control grid 33 and the cathode 34 of the pentode 35. The plate or output circuit in the last stage of the amplifier, which includes the triode 36, is shown connected in series with the primary winding 37 of transformer 38. The secondary winding 39 of this transformer is connected to the shaded windings 41 of the shaded pole motor 40, the main field winding 44 of the motor being connected to the A. C. supply as indicated in the drawings. The plate circuit of the pentode 35 and the triode 36 are supplied by the direct current derived from a full wave rectifier tube 42 through the filter network indicated generally at 43. The filament for the tube 42 is energized from the secondary winding 46 of the transformer 19 and the plates of the rectifier tube 42 are shown connected across the transformer secondary 45, the mid-tap of which is connected to the conductor 32 to form the negative terminal of the D. C. supply.

In order to provide for an adjustment in the amplified signal applied to the grid of the pentode from the output terminals of the bridge network for controlling the speed of the motor 40 a gain adjustment is provided in the second amplification stage by connecting the grid of the triode 36 to a sliding contact 29 on the grid input resistor 39. As shown, the connections of the motor 40 are such that it may be selectively controlled for rotation in one direction or in an opposite direction by a 180° change in the phase relation of the voltage impressed across the shading windings with respect to the voltage impressed across the main field winding. It is apparent also that for any setting of the gain adjustment 29 the rotational speed of motor 40 will be governed by the signal amplitude applied to the control grid of the pentode 35. Accordingly the direction of rotation of the motor 40 will be dependent upon the direction of change in the flow conditions from their desired flow and the speed in rotation of the motor 40, for a fixed gain adjustment of the amplifier, will depend upon the magnitude of change in the condiiton of flow of fluid through the conduit 26.

The motor is shown connected by means of suitable gearing illustrated at 47—48 in the drawings to position a regulating valve 50 in the conduit 26 for controlling the flow of fluid therein. The motor 40 is at the same time geared to drive or to position the sliding contact 51 of the sliding wire resistance 14 through the worm gear 52 and worm wheel 58 through which is threaded the threaded shaft 54 so that the latter is advanced or retracted by turning the wheel 53. The sliding contact 51 for the differential potentiometer is insulatably supported on a carriage 55 that is fixed to the threaded shaft 54 for translatory movement therewith by the set screw 56 threaded through the carriage 55 to lock into the keyway 57 milled into the shaft 54. This keyway 57 serves to effect translatory movement of the shaft 54 and carriage 55 upon rotation of the worm wheel 58 since a set screw 56' is shown threaded through the pedestal 53 to extend into the keyway 57 milled into the shaft 54. Thus when the motor 40 is energized for rotation as result of an unbalance in the first bridge network the motor drive effects a corrective adjustment in the flow conditions by moving the regulating valve 50 to adjust the flow conditions, and the motor 40 also drives the internally threaded worm wheel 58 through the worm gear 52, to effect a corresponding rebalance adjustment of the first bridge network by the adjusting movement which is transmitted to the sliding contact 51, moving the contact 51 along slide wire resistance 14.

To prevent the motor 40 from immediately effecting the rebalance of the bridge so as to reduce to zero value the voltage appearing across the terminals 27—28, we have provided an additional translating device such as the shaded pole motor 70 so that movement may be transmitted also to the slide wire resistance 14 in the same direction as the sliding contact 51. This second electric translating device derives its energizing action from whatever voltage may appear across the terminals 27'—28 of the second bridge network 17 depending upon the direction and magnitude of the unbalance produced in this second network by the changed condition of flow from its desired value.

The conductors 61 and 62 leading from the terminals 27'—28 respectively, of the second bridge network 17 are shown connected to the input of the first stage of an amplifier 60. For the purpose of simplicity in illustrating and convenience in description of the invention the amplifier 60 is of the same type as that indicated at 30 in the drawings, although it will be understood that amplifiers other than the type illustrated herein may be used in either or both of the motor control circuits. The amplifiers illustrated are standard class A, two stage, audio amplifiers employing a pentode in the first stage because of its high amplification factor, and employing a triode in the second stage because of its lower plate impedance which more nearly matches the impedance of the motor shading windings. Accordingly the amplifiers illustrated have certain advantages which make their use in this type of a regulator control more or less conventional. More specifically the conductors 61 and 62 each leading from a respective terminal of the second bridge are connected respectively to the control grid 63 and cathode 64, of the pentode 65. The plate or output circuit from the last stage of the amplifier which includes the triode 66 is connected in series with the primary winding 67 of a transformer 68, that has its secondary winding 69 connected to the shading coils 71 of the shaded pole motor 70. The main field winding 74 of the motor is connected to an A. C. source of supply as indicated by the drawings. To insure proper phase relationships the field windings 44, 74 of the motors are preferably connected to the same A. C. supply as that provided (through the transformer 19) for energization of the primary coil 11 of the flow-controlled inductive device.

The plate circuit of the pentode 65 and triode 66 are supplied from the same D. C. source that supplies the amplifier 30, namely the full wave rectifier tube 42 and its filter circuit 43. In order that the speed of the shaded pole motor 70 may be controlled for any degree of unbalance existing in the second bridge network 17 we have provided means for adjusting the amplification of the signal output from this bridge. As illustrated a gain adjustment is provided by connecting the grid of the triode 66 to a sliding contact 59 on the grid input resistor 69. As shown, the connections of the motor 70 are such that it may be selectively controlled for rotation in one direction or in reverse direction by a 180° change in the phase relation of the voltage impressed across the shading windings with respect to the voltage impressed across the main field windings; accordingly, the speed and rotation of the shaded pole motor 70 will be responsive to the degree of unbalance of its corresponding bridge network for any fixed setting of the gain adjustment.

The motor 70 is shown connected to position the movable slide wire resistance 14, through a shaft 77, a worm gear 82, and a worm wheel 83. The slide wire resistance 14 which forms an impedance arm of the first bridge network is insulatably supported on a threaded shaft 84 to move with said shaft by means of two clamps shown diagrammatically at 85 and 86. Translatory movement is imparted to the shaft by rotating the worm wheel 83 which is shown threaded onto the shaft. The set screw 87, in the pedestal 88 through which shaft 84 extends, prevents rotation of this shaft with the worm wheel 83 by engaging the milled keyway 89 and thus effects the translatory movement of the shaft through the worm wheel 83. Thus, when the motor 70 is energized for rotation as result of the bridge unbalance the motor drive modifies the rebalance adjustment which is produced by the movement of the sliding contact 51 relative to the resistance 14 which is effected by a drive from the motor 40. The motor 70 by moving the slide wire resistance 14 limits the relative movement of the slide wire resistance 14 and the sliding contact 51. The separate adjustment in amplification of the output of each bridge network permits an independent adjustment of the speed of each motor which in turn provides a means for adjusting the time lag in control.

While the operation of the apparatus disclosed in the drawing should be clearly apparent from the foregoing it may be pointed out here that the setting of the slidable contact 27' of the bridge circuit 17 governs the rate of flow to be maintained (or pressure, for example if core 18 is actuated by a Sylphon-type pressure sensitive element). The rebalance always occurs when the core returns to a predetermined position represented by the desired flow or pressure (and set by the adjustment of the slidable contact 27'); and the valve or other controlled element assumes such a position as is necessary to provide the desired flow (or pressure)—the response of the valve having the dead-beat character of "positioning" control, but coming rapidly to its ultimate desired adjustment, rather than merely to a changed position corresponding to a changed position of the detecting device. Thus a particular advantage of the combined "positioning-floating" control is that it is faster in response to a change in the condition being regulated, such as a change in the rate of flow, since two factors, namely the drive from the motor 70 to the slide wire resistance 14 and the movement of the core 18 by the float of the flow meter 20 each contribute to the initial degree of unbalance in the first bridge and thus each in effect contribute (immediately or with only the slightest delay) to the initial motion imparted to the motor driven regulating valve 50 for effecting a corrective adjustment in the changed condition of the rate of flow.

It should be pointed out also that the two amplifiers illustrated in the drawings, in actual operative embodiment of the invention, be built into a single unit with a single D. C. power supply and two independent amplifier circuits. It is also evident that two flow meters may be used each being operable to vary the impedance in separate branch circuits of two independent networks for deriving variable electrical quantities in acordance with position of the float of a respective one of the flow meters. Likewise other changes in the circuit combinations and structural embodiments of the invention may be made without departing from the spirit and scope of the invention defined in the appended set of claims.

We claim:

1. In a system for controlling a variable quantity, comprising a first reversible electric motor for producing control effects tending to increase or decrease said quantity accordingly as the motor operates in one direction or in an opposite direction, a second reversible electric motor, a control member movable in accordance with variations in said quantity to be controlled, an electrical control circuit for each of said motors having means cooperating with said member for producing electrical quantities variable in phase and magnitude in accordance with the direction and magnitude of adjustment of said control means for effecting operation of said motors, a pair of relatively movable elements comprising a resistance and slidable tap for the resistance, said elements being connected in a circuit for increasing or decreasing the electrical quantity producing the operating effect of said first motor in accordance with their relative positioning and means mechanically connecting the resistance element to the second one of said motors and the tap element to the first one of said motors for effecting simultaneous movement of each of said elements in the same direction.

2. In a system for controlling a variable quantity comprising a first reversible electric motor for producing control effects tending to increase or decrease said quantity accordingly as the motor operates in one direction or in an opposite direction, a second reversible electric motor, control means adjustable in accordance with variations in said quantity, an electrical control circuit for each of said motors having means cooperating with said control means for producing electrical quantities variable in phase and magnitude in accordance with the direction and magnitude of adjustment of said control means for effecting operation of said motors, a pair of elements relatively movable and comprising a resistance and a slidable tap for said resistance, said elements being connected in a circuit for increasing or decreasing the electrical quantity producing the operating effect of said first motor in accordance with their relative positioning and means mechanically connecting the resistance element to the second one of said motors and the tap element to the first one of said motors for effecting simultaneous movement of each of said elements in the same direction.

THOMAS A. ABBOTT.
JEROME B. McMAHON.

REFERENCES CITED

The following references are of record in the file of this patent:

UNITED STATES PATENTS

| Number | Name | Date |
|---|---|---|
| 2,151,222 | Millard | Mar. 21, 1939 |
| 2,173,799 | Baak | Sept. 19, 1939 |
| 2,208,562 | Locke | July 23, 1940 |
| 2,208,762 | Hartig et al. | July 23, 1940 |
| 2,228,336 | Annin | Jan. 14, 1941 |
| 2,234,349 | Mac Kay | Mar. 11, 1941 |
| 2,300,537 | Davis | Nov. 3, 1942 |